United States Patent
Wang et al.

(10) Patent No.: US 12,455,790 B2
(45) Date of Patent: *Oct. 28, 2025

(54) EFFICIENT IO PROCESSING

(71) Applicant: Nvida Corporation, Santa Clara, CA (US)

(72) Inventors: Jin Wang, Cupertino, CA (US); Siamak Nazari, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,619

(22) Filed: Apr. 2, 2024

(65) Prior Publication Data
US 2024/0338280 A1 Oct. 10, 2024

Related U.S. Application Data

(63) Continuation of application No. 18/101,864, filed on Jan. 26, 2023, now Pat. No. 11,977,452, which is a
(Continued)

(51) Int. Cl.
*G06F 11/14* (2006.01)
*G06F 3/06* (2006.01)

(52) U.S. Cl.
CPC .......... *G06F 11/1451* (2013.01); *G06F 3/061* (2013.01); *G06F 3/0653* (2013.01);
(Continued)

(58) Field of Classification Search
CPC .... G06F 11/1451; G06F 3/061; G06F 3/0653; G06F 3/0659; G06F 3/0665;
(Continued)

(56) References Cited

U.S. PATENT DOCUMENTS

| | | |
|---|---|---|
| 7,451,287 B2 | 11/2008 | Shinozaki et al. |
| 7,487,228 B1 | 2/2009 | Preslan et al. |

(Continued)

FOREIGN PATENT DOCUMENTS

| | | |
|---|---|---|
| EP | 2755132 A4 | 8/2014 |
| WO | 200415522 A3 | 5/2004 |

(Continued)

OTHER PUBLICATIONS

Notice of Allowance issued in U.S. Appl. No. 18/101,864, dated Jan. 5, 2024.
(Continued)

*Primary Examiner* — Hosain T Alam
*Assistant Examiner* — Zubair Ahmed
(74) *Attorney, Agent, or Firm* — Hogan Lovells US LLP

(57) ABSTRACT

A method for a storage system to process input and output operations. The method includes receiving writes over time to an address at a base virtual volume, storing each of the writes in a physical storage at a new location that is without existing data, tagging each stored write with a different generation number to distinguish between different versions of data written to the address at the base virtual volume, receiving a read of the address at the base virtual volume, and, in response to the read of the address at the base virtual volume, returning one of the stored writes that is tagged with a newer generation number than a remainder of the stored writes.

20 Claims, 11 Drawing Sheets

Related U.S. Application Data continuation of application No. 16/748,454, filed on Jan. 21, 2020, now abandoned.

(52) U.S. Cl.
CPC .......... *G06F 3/0659* (2013.01); *G06F 3/0665* (2013.01); *G06F 3/0689* (2013.01); *G06F 11/1464* (2013.01); *G06F 11/1469* (2013.01); *G06F 2201/835* (2013.01); *G06F 2201/84* (2013.01)

(58) Field of Classification Search
CPC ............... G06F 3/0689; G06F 11/1464; G06F 11/1469; G06F 2201/835; G06F 2201/84; G06F 3/0619; G06F 3/065; G06F 3/0658
USPC .................................................. 711/162, 161
See application file for complete search history.

(56) References Cited

U.S. PATENT DOCUMENTS

| | | | |
|---|---|---|---|
| 8,103,843 B2 | 1/2012 | Satoyama et al. | |
| 8,799,367 B1 | 8/2014 | Condict et al. | |
| 9,325,588 B2 | 4/2016 | Lancaster et al. | |
| 9,354,974 B2 | 5/2016 | Clifone et al. | |
| 10,691,666 B1 | 6/2020 | McDowell et al. | |
| 2006/0179261 A1 | 8/2006 | Rajan | |
| 2008/0005141 A1* | 1/2008 | Zheng | ................. G06F 16/1752 |
| 2011/0119459 A1* | 5/2011 | Satoyama | ........... G06F 11/1458 |
| | | | 711/E12.103 |
| 2011/0179082 A1 | 7/2011 | Vaghani et al. | |
| 2011/0238888 A1* | 9/2011 | Chiu | ................... G06F 12/0246 |
| | | | 711/170 |
| 2012/0054152 A1 | 3/2012 | Adkins et al. | |
| 2012/0159098 A1 | 6/2012 | Cheung et al. | |
| 2013/0124798 A1 | 5/2013 | Aszmann et al. | |
| 2015/0039572 A1 | 2/2015 | Raghuwanshi et al. | |
| 2015/0081954 A1* | 3/2015 | Yamamoto | ............... G06F 3/064 |
| | | | 711/103 |
| 2017/0169233 A1 | 6/2017 | Hsu et al. | |
| 2017/0192860 A1 | 7/2017 | Vijayan et al. | |
| 2018/0173731 A1 | 6/2018 | Nazari et al. | |
| 2018/0241821 A1 | 8/2018 | Shetty et al. | |
| 2020/0004772 A1 | 1/2020 | Maybee et al. | |

FOREIGN PATENT DOCUMENTS

| | | |
|---|---|---|
| WO | 2021150563 A1 | 7/2021 |
| WO | 2021150576 A1 | 7/2021 |

OTHER PUBLICATIONS

Non-Final Office Action issued in U.S. Appl. No. 16/748,454, dated Mar. 9, 2021.
Final Office Action issued in U.S. Appl. No. 16/748,454, dated Aug. 26, 2021.
Non-Final Office Action issued in U.S. Appl. No. 16/748,454, dated Jan. 6, 2022.
Final Office Action issued in U.S. Appl. No. 16/748,454, dated Jul. 28, 2022.

* cited by examiner

EFFICIENT IO PROCESSING

CROSS-REFERENCE TO RELATED APPLICATIONS

This patent document is a continuation and claims benefit of the earlier filing date of U.S. patent application Ser. No. 18/101,864, filed Jan. 26, 2023, which is a continuation and claims benefit of the earlier filing date of U.S. patent application Ser. No. 16/748,454, filed Jan. 21, 2020, both of which are hereby incorporated by reference in their entirety.

BACKGROUND

Primary storage systems store active data that is frequently accessed by applications while secondary storage systems back up the data. Primary storage systems create virtual volumes from physical storage devices, such as hard disk drives. Clients access these virtual volumes on the primary storage systems through SCSI commands. SCSI commands for normal storage operation include Reads and Writes. Enhanced SCSI commands such as XCOPY and UNMAP enable clients to offload complex operations to the primary storage system. Primary storage systems provide additional software capabilities, such as snapshots for preserving older versions of the data. Providing all these features while meeting the performance demands of a primary storage system is a daunting task.

BRIEF DESCRIPTION OF THE DRAWINGS

In the drawings:

FIG. 1-2 is a block diagram illustrating view families for defining and managing a base volume 114 and a snapshot of the base volume in some examples of the present disclosure.

FIG. 1-3 is a block diagram illustrating a base volume structure and a snapshot volume structure in some examples for the present disclosure.

FIG. 2-1 is a block diagram illustrating a method for an input and output (IO) processor of FIG. 1-1 to handle a write request in some examples of the present disclosure.

FIG. 2-2 is a block diagram illustrating a method for the IO processor of FIG. 1-1 to handle a read request to a virtual volume of FIG. 1-1 in some examples of the present disclosure.

FIG. 2-3 is a block diagram illustrating a method for a garbage collector of FIG. 1-1 to periodically delete unneeded old data in some examples of the present disclosure.

FIG. 3 is a block diagram illustrating the methods of FIGS. 2-1, 2-2, and 2-3 in some examples of the present disclosure.

FIG. 4-1 is a block diagram illustrating a method for the IO processor of FIG. 1-1 to create a snapshot in some examples of the present disclosure.

FIG. 4-2 is a block diagram illustrating a method for the IO processor of FIG. 1-1 to handle a read request to a snapshot in some examples of the present disclosure.

FIG. 4-3 is a block diagram illustrating a method for the garbage collector of FIG. 1-1 to periodically delete unneeded old data in some examples of the present disclosure.

FIG. 6-1 is a block diagram illustrating a method for the IO processor of FIG. 1-1 to perform an XCOPY command in some examples of the present disclosure.

FIG. 6-2 is a block diagram illustrating a method for the processor of FIG. 1-1 to handle a read request to a second (destination) virtual volume in some examples of the present disclosure.

FIG. 6-3 is a block diagram illustrating a method for the garbage collector of FIG. 1-1 to periodically delete unneeded old data in some examples of the present disclosure.

FIG. 8-1 is a block diagram illustrating a method for the IO processor of FIG. 1-1 to perform an UNMAP command in some examples of the present disclosure.

FIG. 8-2 is a block diagram illustrating a method for the processor of FIG. 1-1 to handle a read request to a virtual volume in some examples of the present disclosure.

FIG. 8-3 is a block diagram illustrating a method for the garbage collector of FIG. 1-1 to periodically delete unneeded old data in some examples of the present disclosure.

Use of the same reference numbers in different figures indicates similar or identical elements.

DETAILED DESCRIPTION

Figure 1:
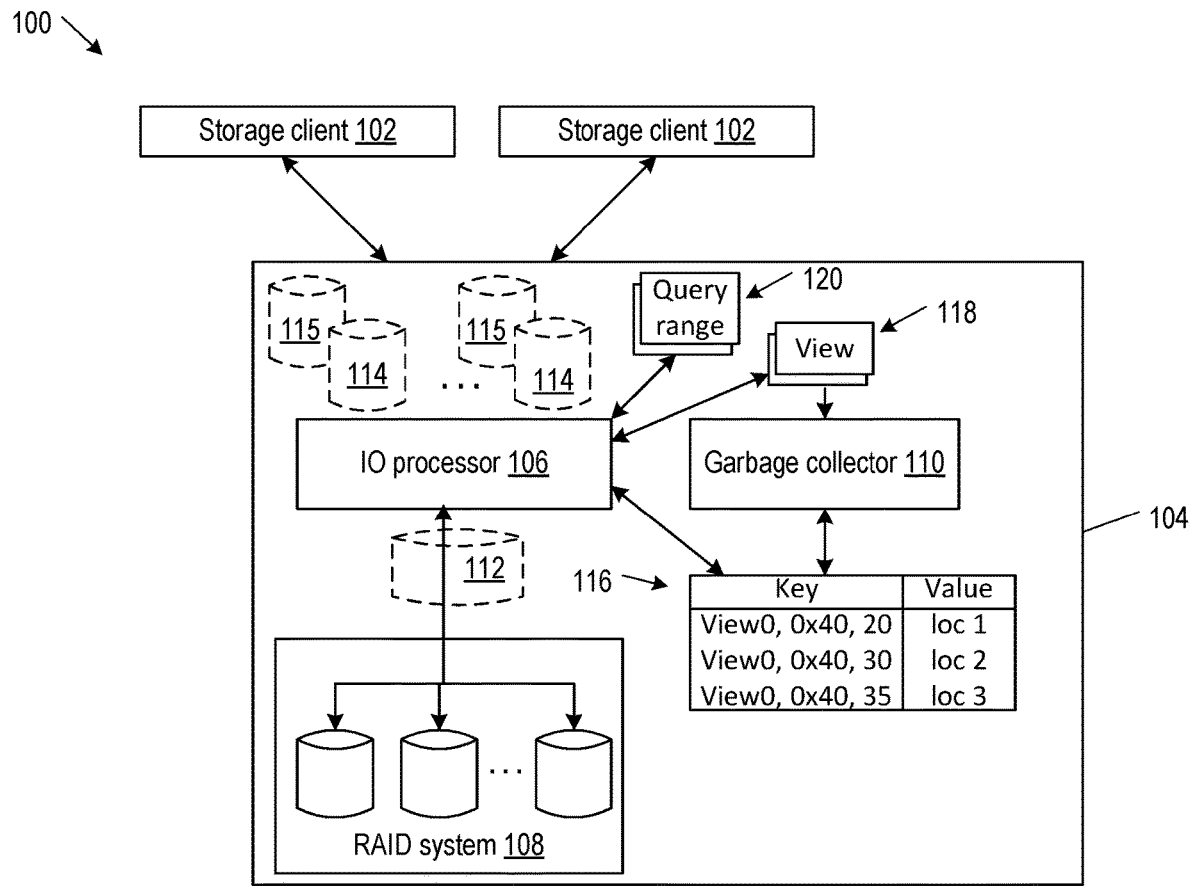
FIG. 1-1 is a block diagram illustrating a computer system in some examples of the present disclosure.

A primary storage system must determine where to store incoming data and how to preserve older versions of the incoming data for snapshot purposes. To preserve an old version of data, the primary storage system typically reads and writes the old version of the data to a new location for a snapshot, before overwriting the old version of the data in place (i.e., saving the new write data in the original physical location where it saved the old data). This incurs additional work, in the form of a read and a write, to preserve the old data for the snapshot. Furthermore, overwriting the old data in place causes additional read/modify/write cycles when the underlying storage system uses a redundant array of independent disks (RAID) configuration such as RAID5 or RAID6. The primary storage systems may also process enhanced SCSI by performing actual storage operations. For example, the primary storage system may perform the XCOPY command by reading data from a source and writing them to a destination, and the primary storage system may perform the UNMAP command by deleting existing exception pointers and marking the region to be unmapped as unwritten. All the described operations can incur long processing times in the primary storage system.

In some examples of the present disclosure, a storage system meets these requirements by never overwriting existing data in the underlying storage for a virtual volume. Instead, the storage system writes all incoming data to new locations in the underlying storage. In other words, the storage system never overwrites in place. When a given offset in the virtual volume is written again, new data for the offset is written to a new location in the underlying storage different from the original location of old data for the same offset.

In some examples of the present disclosure, the storage system tags each incoming write with a key that includes a generation number (also called "gennumber"). The generation number is incremented for each write so different versions of data written to a given offset are differentiated by their generation numbers. The storage system uses the generation numbers to create metadata structures called "views" to create and manage virtual volumes. The storage system creates "dynamic" views to represent a base virtual volume ("base volume") and "static" views to quickly create a snapshot virtual volume ("snapshot") of the base volume. The storage system also uses the generation numbers to create "range" views and metadata structures called "query ranges" to quickly perform enhanced SCSI commands such as XCOPY and UNMAP. Using a garbage collection process, the storage system deletes unneeded versions of the data with generation numbers that fall outside of the ranges specified in the views. For a given view, the garbage collection process may also keep the most recent version of a write in the range specified in the view and delete other versions.

In some examples of the present disclosure, the storage system writes (flushes) data to the RAID layer only upon accumulation of a full stripe since the storage system writes all incoming data to new locations. This avoids the additional read/modify/write for RADI5/RAID 6 configuration that would otherwise be needed for overwriting existing data.

In some examples of the present disclosure, the storage system also avoids the need to read old data and write it somewhere else for a snapshot because the storage system writes incoming data to new locations so the older versions of the incoming data are available for a snapshot if a snapshot exists. For example, if the same page is written multiple times, each version of the page gets its own generation number. The base volume needs only the version with the highest generation number. A snapshot needs that version of the page which has the highest number in the range between (1) the generation number at the creation of the base volume and (2) the generation number at the creation of the snapshot. The garbage collector looks at each stored page and determines if its generation number falls in any of the required ranges of the snapshots or base volumes. If it does, the garbage collector leaves the page untouched. If not, the garbage collector deems the page as garbage and reclaims the corresponding location in the underlying storage.

Similarly, in some examples of the present disclosure, the storage system also avoids the need to read data from a source and write them to a destination for an enhanced SCSI command such as XCOPY. Instead, the storage system creates a range view to preserve the source data and query ranges to redirect reads of copied data from the destination to the source.

In some examples of the present disclosure, the storage system avoids changing the virtual to physical mapping for the region being unmapped when responding to an enhanced SCSI command such as UNMAP. Instead, the storage system uses a query range to attach a special "zero" view to a virtual volume for an address (e.g., logical block address or LBA) range being unmapped. The zero view indicates that reads from that view should return zero data.

FIG. 1-1 is a block diagram illustrating a storage network 100 in some examples of the present disclosure. Network 100 includes computer systems such as storage clients 102 and a (primary) storage system 104. Storage system 104 includes an input and output (IO) processor 106, an array of redundant disks 108, which may be hard disk drives, solid state drives, or other nonvolatile storage devices, and a garbage collector 110. Redundant disks 108 are combined to form the underlying storage for virtual volumes 112. Underlying storage or virtual volumes 112 may have a redundant array of independent disks (RAID) 5 or 6 configuration for performance and redundancy. IO processor 106 stores or writes to base volumes 114 in storage 112. IO processor 106 can create snapshots 115 of base volumes 114. IO processor 106 records the mapping between the written addresses in a virtual volume and the storage locations in storage 112 with key-value pairs 116, which are maintained in a key-value database that may also reside in storage 112. For a given key-value pair 116, the key identifies a base volume 114 (through a metadata structure called "view family" as described in detail later), an address at the base volume, and a generation number of when the write occurred, while the value identifies a storage location in storage 112 where a version of the data for the address at the virtual volume is stored. Note the generation number is global for the entire storage network 100 as writes may arrive for multiple base volumes 114. The components of storage system 104 may be implemented as software executed by an application processor, application-specific integrated circuit, or a combination thereof.

A base volume 114 and its snapshots 115, if any, consist of one or multiple view families. Each view family covers a specific address range of virtual volume 114 and snapshots 115. Each view family is identified with a unique ID and receives a generation number when it is created. Each view family has one dynamic view. The dynamic view has generation number "0," which means the current highest generation number. The dynamic view has the same address range as its view family's range. Each static view has a generation number when it was created. Each static view covers an address range that is equal to or smaller than its view family's range.

Figures 1, 2, 3:
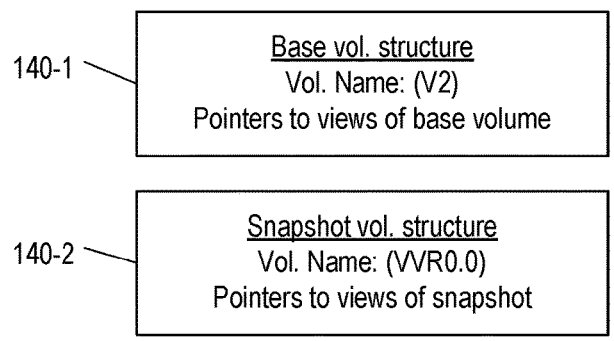
Figures 1, 2:
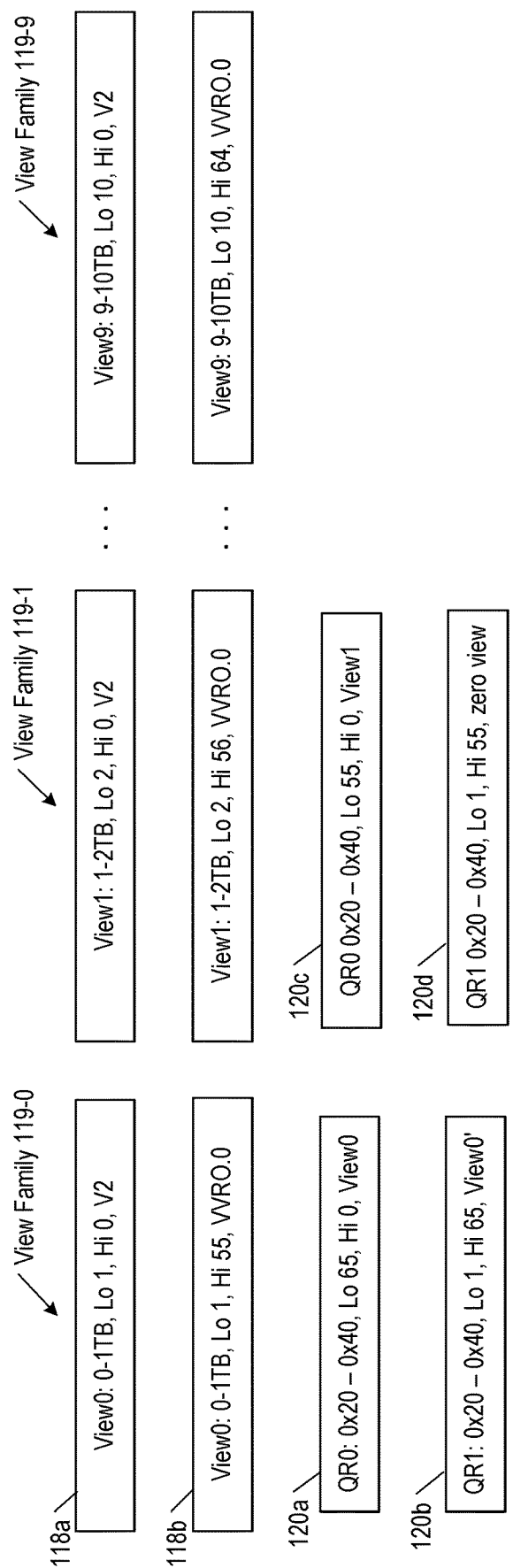
Figures 1, 2:
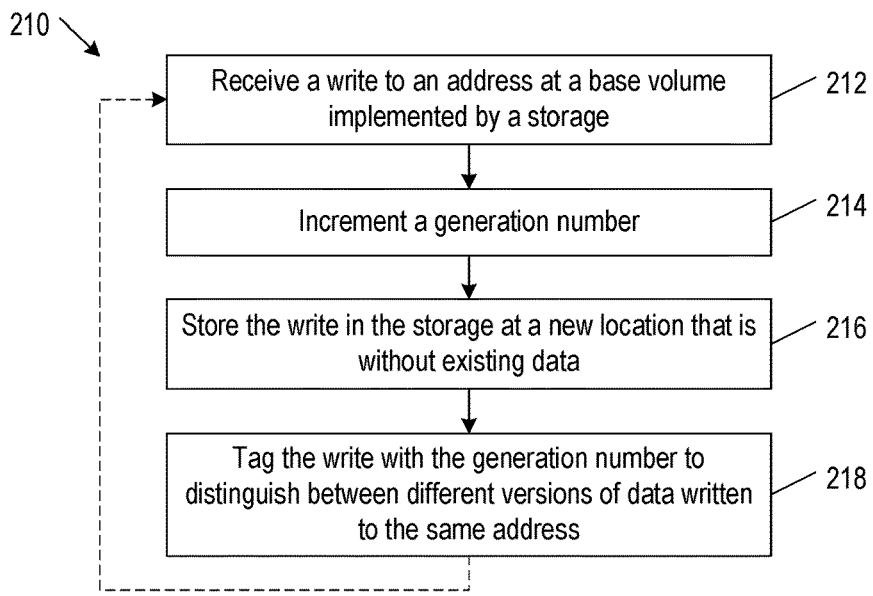
Figure 2:
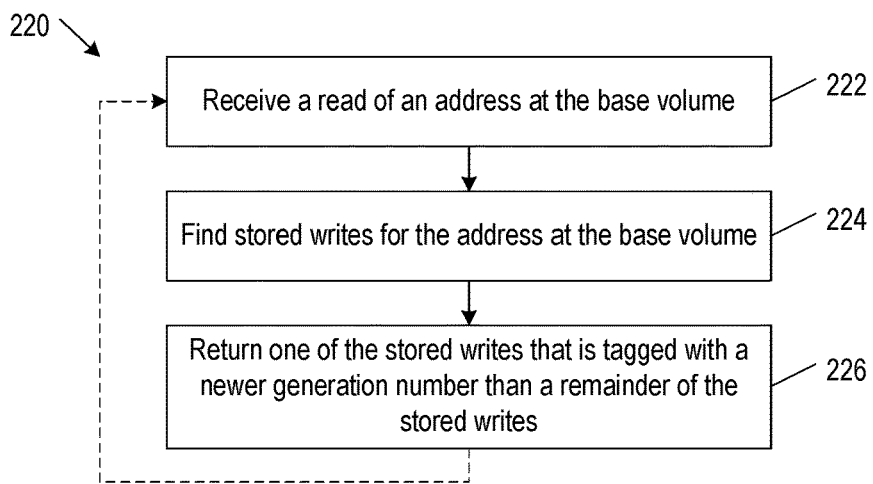
Figures 2, 3:
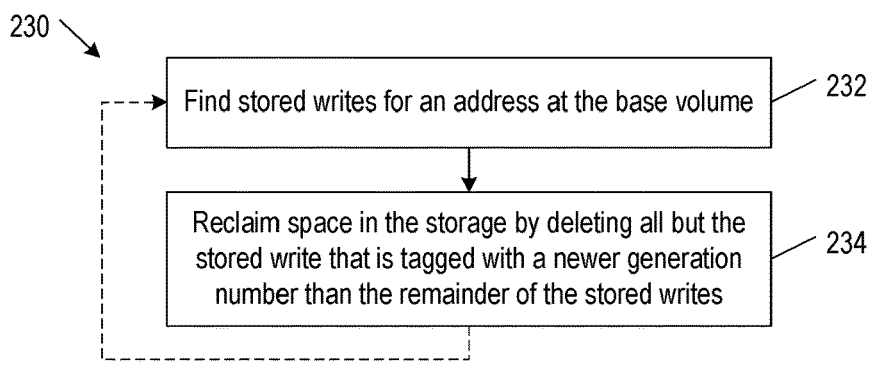
Figure 3:
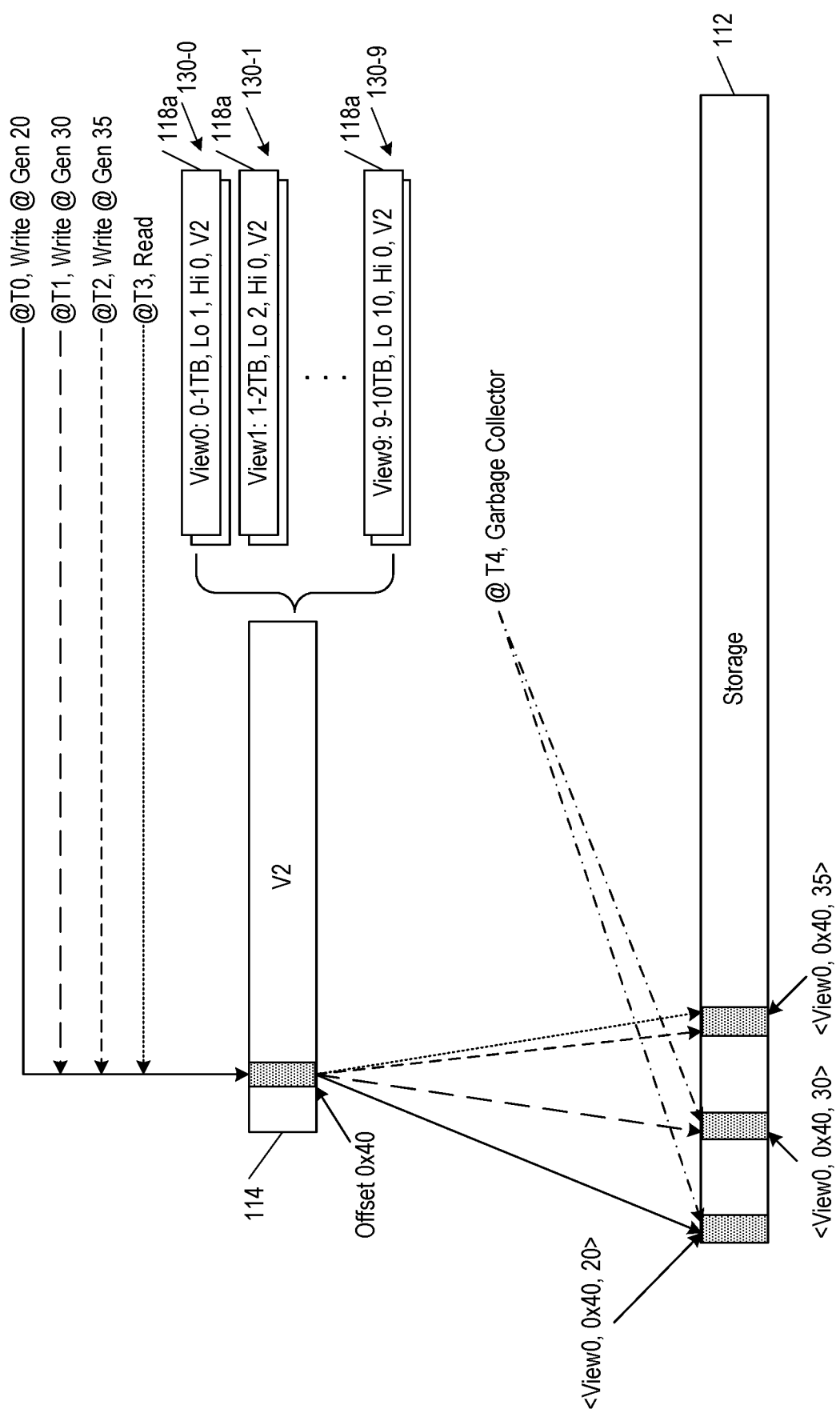

FIG. 1-2 is a block diagram illustrating view families 119-0, 119-1, . . . 119-9 (collectively as "view families 119" or individually as a generic "view family 119") for defining and managing an exemplary 10 terabyte (TB) base volume 114 (FIG. 1-1) and a snapshot 115 (FIG. 1-1) of the base volume in some examples of the present disclosure. IO processor 106 may generate view families 119 in response to a user request to create base volume 114, create snapshot 115, copy data from one volume 114 to another, and unmap data from base volume 114.

Each view family 119 manages an address range. For example, view family 119-0 manages the 0 to 1TB address range, view family 119-1 manages the 1 to 2TB address range, . . . and view family 119-9 manages the 9 to 10TB address range. Each view family 119 includes a dynamic view 118a that manages the view family's address range in base volume 114. Each view family 119 may include a static view 118b that represents the view family's address range in snapshot 115. Each view 118 identifies its view family (e.g., "View 0"), an address range, a generation number range ("Lo" and "Hi" generation numbers), and optionally its base or snapshot volume name. For a dynamic view 118a, the low generation number is the generation number of when base volume 114 (or the dynamic view itself) is created, and the high generation number is set as "0" to indicate the current generation number (e.g., the largest generation number). Hereafter, "creation generation number" of a metadata structure refers to the generation number when the metadata structure is created or a command that caused the creation of the metadata structure is received. For static view 118b, the low generation number is the creation generation number of base volume 114 (or the corresponding dynamic view 118a), while the high generation number is the creation generation number of snapshot volume 115. Details of the snapshotting process are described later.

View families 119 may include query ranges 120 (FIG. 1-1). Each query range 120 identifies its ID, an address range, a generation number range, and a view family of a base volume 114 to be searched. For example, view family 119-0 includes a query range 120a followed by a query range 120b for copying an address range of a source volume 114 (indicated by source volume view family View0') to a destination volume 114 (indicated by destination volume view family View0). For query range 120a having ID "QR0," the low generation number 65 is the creation generation number of the copy command, the high generation number is set as "0" to indicate the current generation number (e.g., the largest generation number), and the view family is the view family View0 for the corresponding address range in the destination volume. For query range 120b, the low generation number 1 is the creation generation number of the source volume (or its dynamic view 118a), the high generation number 65 is the creation generation number of the copy command, and the view family is view family View0' for the corresponding address range in the source volume. Details of the copying process are described later.

As another example, view family 119-1 includes a query range 120c followed by a query range 120d for unmapping an address range of base volume 114. For query range 120c, the low generation number 55 is the creation generation number of an unmap command, the high generation number is set as "0" to indicate the current generation number (e.g., the largest generation number), and the view family is the view family View1 for the corresponding address range in base volume 114. For query range 102d, the low generation number 1 is the creation generation number of base volume 114 (or its dynamic view 118a), the high generation number 55 is the creation generation number of the unmap command, and the view family identifies a special "zero" view, which causes IO processor 106 to return zero data. Details of the unmapping process are described later.

A view 118 optionally identifies its base or snapshot volume name. Alternatively, separate metadata structures are used to map base volumes or snapshots to views 118 in a view family 119. FIG. 1-3 is a block diagram illustrating a base volume structure 140-1 and a snapshot volume structure 140-2 in some examples for the present disclosure. Base volume structure 140-1 includes a base volume name (e.g., V2) and pointers to dynamic views 118a that define the base volume. Similarly, snapshot volume structure 140-2 includes a snapshot name (e.g., VVR0.0) and pointers to static views 118b that define the snapshot volume.

FIG. 2-1 is a block diagram illustrating a method 210 for IO processor 106 (FIG. 1-1) to handle a write request from a storage client 102 (FIG. 1-1) in some examples of the present disclosure. Method 210 may begin in block 212.

In block 212, IO processor 106 receives a write to an address (an offset) at virtual volume 114 (FIG. 1-1) implemented on storage 112 (FIG. 1-1) of RAID system 118 (FIG. 1-1). Block 212 may be followed by block 214.

In block 214, IO processor 106 increments or otherwise changes a generation number in response to the write. The generation number is global for the entire storage system 104 as writes may arrive for multiple base volumes 114 (FIG. 1-1). Block 214 may be followed by block 216.

In block 216, IO processor 106 stores the write at a new location in storage 112 that is without existing data. In other words, for a given write to an address in base volume 114, IO processor 106 does not overwrite any old data with new data in storage 112. Block 216 may be followed by block 218.

In block 218, IO processor 106 tags the stored write with the current generation number. Being incremented at each write, the generation number distinguishes between different versions of data written to the same address at base volume 114. In some examples, IO processor 106 tags the stored write by creating metadata 116 (FIG. 1-1) that maps the write between base volume 114 and storage 112. In some examples, metadata 116 is a key-value pair that contains a key and a value. The key identifies a view family 119 that manages the address range of base volume 114, the address being written, and the current generation number, and the value identifies a storage location in storage 112 where the new data is stored. Block 218 may loop back to block 212 to handle another write to one of virtual volumes 114.

FIG. 2-2 is a block diagram illustrating a method 220 for IO processor 106 to handle a read request to a base volume 114 (FIG. 1-1) in some examples of the present disclosure. Method 220 may begin in block 222.

In block 222, IO processor 106 receives a read of an address (an offset) at base volume 114. Block 222 may be followed by block 224.

In block 224, in response to the read of the address at base volume 114, IO processor 106 finds all the stored writes for that address at the base volume. Specifically, IO processor 106 queries all the key-value pairs 116 (FIG. 1-1) for those having keys that identify the specific address being read and the view family that manages an address range of base volume 114 that includes the address being read. Block 224 may be followed by block 226.

In block 226, IO processor 106 returns one of the stored writes for the address being read that is tagged with a newer generation number than the remainder of the stored writes. Specifically, IO processor 106 determines one of the key-value pairs 116 found in block 224 that has a key with the most recent generation number, reads the corresponding value to determine a storage location in storage 112, and returns the data stored at that location. Block 226 may loop back to block 222 to handle another read to one of virtual volumes 114.

FIG. 2-3 is a block diagram illustrating a method 230 for garbage collector 110 (FIG. 1-1) to periodically delete unneeded old data from storage 112 (FIG. 1-1) in some examples of the present disclosure. Method 230 may begin in block 232.

In block 232, garbage collector 110 finds all the stored writes for a given address at a base volume 114. Specifically, garbage collector 110 queries all the key-value pairs 116 (FIG. 1-1) for those having keys that identify the view family of the base volume 114 that manages the given address and also the address. Block 232 may be followed by block 234.

In block 234, garbage collector 110 reclaims space in storage 112 by deleting all but the stored write that is tagged with a newer generation number than the remainder of the stored writes. Specifically, garbage collector 110 determines one of the key-value pairs 116 found in block 232 that has a key with the most recent generation number and deletes the remainder of the stored writes and their key-value pairs 116. Block 234 may loop back to block 232 to process another address of the same base volume 114.

After looping through all the addresses of one base volume 114, garbage collector 110 may process another virtual volume 114. Alternatively, garbage collector 110 may also perform method 230 in parallel for multiple addresses or multiple virtual volumes 114.

FIG. 3 is a block diagram illustrating methods 210, 220, and 230 (FIGS. 2-1, 2-2, and 2-3) in some examples of the present disclosure. In FIG. 3, a 10 terabyte (TB) base volume 114 named V2 is defined and managed with dynamic views 118a of a view family View0 for an address range of 0 to 1 TB, a view family View1 for an address range of 1 to 2 TB . . . , and a view family View9 for an address range of 9 to 10TB. Each dynamic view 118a identifies a low generation number that is the creation generation number of base volume V2 (or the dynamic view itself), while a high generation number that is the current generation number (indicated by "0").

At time T0, a storage client 102 (FIG. 1-1) issues a first write command to base volume V2 at an offset 0x40, which falls in the address range managed by view family View0. In response, IO processor 106 (FIG. 1-1) increments the generation number from a prior value to 20 and creates a first key-value pair 116 (FIG. 1-1) having a key of <View0, 0x40, 20> and a value of a first location in storage 112 (FIG. 1-1).

At time T1, storage client 102 issues a second write command to base volume V2 at the same offset 0x40, which again falls in the address range managed by dynamic view 118-0 of view family View0. In response, IO processor 106 increments the generation number from a prior value to 30 and creates a second key-value pair 116 having a key of <View0, 0x40, 30> and a value of a second location in storage 112.

At time T2, storage client 102 issues a third write command to base volume V2 at the same offset 0x40, which again falls in the address range managed by view family View0. In response, IO processor 106 increments the generation number from a prior value to 35 and creates a third key-value pair 116 having a key of <View0, 0x40, 35> and a value of a third location in storage 112.

At time T3, storage client 102 issues a read command to base volume V2 at offset 0x40, which falls in the address range managed by dynamic view 118a of view family View0. In response, IO processor 106 finds the three key-value pairs 116 having keys that identify view family View0 of base volume V2 and offset 0x40 and returns the value from the third key-value pair 116 because it has the most recent generation number.

At time T4, garbage collector 110 (FIG. 1-1) deletes all the stored writes having keys that identify view family View0 of base volume V2 and offset 0x40 but the one corresponding to the third key-value pair 116 because it has the most recent generation number.

Figures 1, 4:
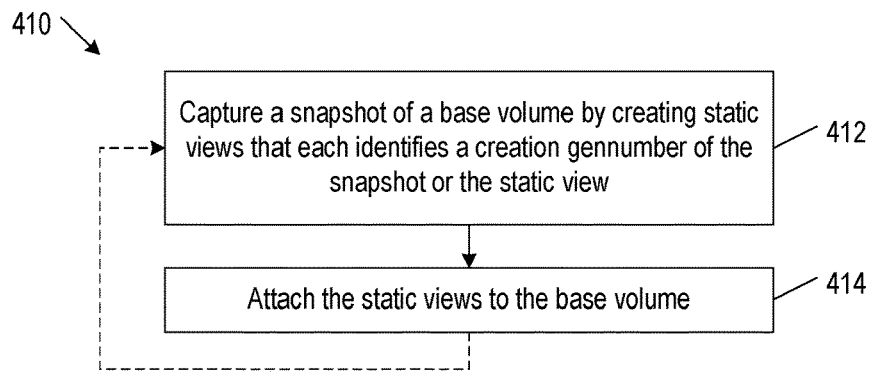
Figures 2, 4:
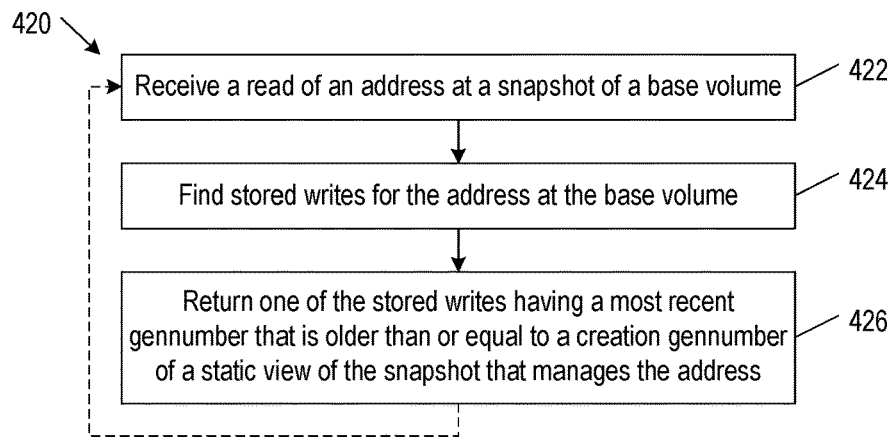
Figures 3, 4:
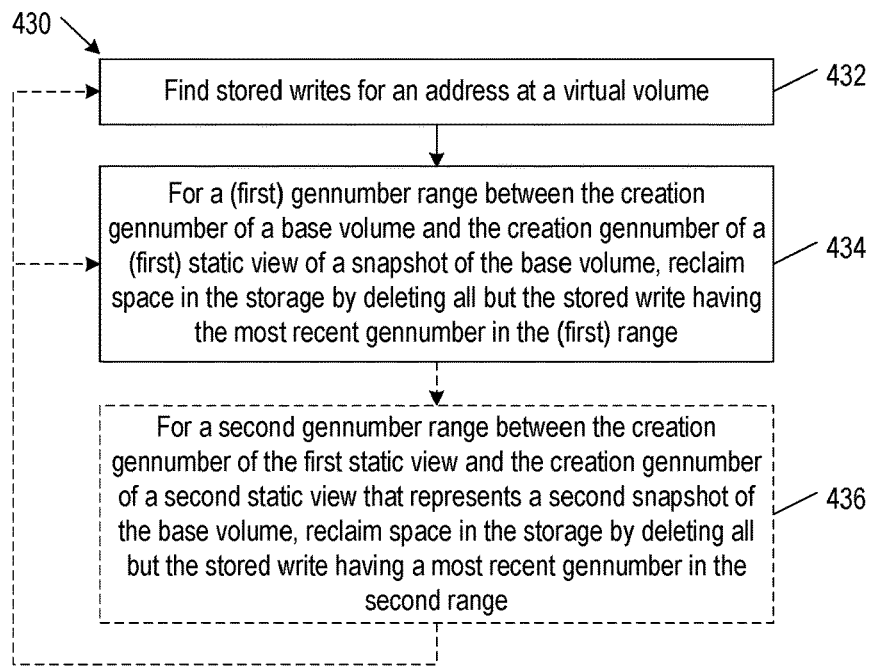

FIG. 4-1 is a block diagram illustrating a method 410 for IO processor 106 (FIG. 1-1) to create a snapshot 115 (FIG. 1-1) of a base volume 114 (FIG. 1-1) in some examples of the present disclosure. Method 410 may begin in block 412.

In block 412, IO processor 106 captures a snapshot 115 of a base volume 114 by creating static views 118b (FIG. 1-2) that each identifies the creation generation number of snapshot 115 or the static view itself. Specifically, each static view 118b identifies its view family 119, the address range managed by the view family, the generation range managed by the static view, and optionally its snapshot name. The generation range identifies (1) a low generation number that is the creation generation number of base volume 114 (or the corresponding dynamic view) and (2) a high generation number that is the creation generation number of snapshot 115 (or the static view itself). Block 412 may be followed by block 414.

In block 414, IO processor 106 attaches the static views 118b to base volume 114. Specifically, IO processor 106 adds the static views 118b to the corresponding view families 119 of base volume 114. Block 414 may loop back to block 412 to capture another snapshot of the same virtual volume or another virtual volume 114.

FIG. 4-2 is a block diagram illustrating a method 420 for IO processor 106 (FIG. 1-1) to handle a read request to a snapshot 115 in some examples of the present disclosure. Method 420 may begin in block 422.

In block 422, IO processor 106 receives a read of an address (an offset) at a snapshot 115 of base volume 114 (FIG. 1-1). Block 422 may be followed by block 424.

In block 424, in response to the read of the address at snapshot 115, IO processor 106 finds all the stored writes for that address at base volume 114. Specifically, IO processor 106 queries all the key-value pairs 116 for those having keys that identify the address being read and base volume 114. More specifically, IO processor 106 queries all the key-values 116 for those having keys that identify the address being read and the view family that manages an address range of base volume 114 that includes the address being read. Block 424 may be followed by block 426.

In block 426, IO processor 106 returns one of the stored writes for that address that is tagged with the most recent generation number that is older than or equal to the creation generation number of a corresponding static view 118 of snapshot 115. Specifically, IO processor 106 looks up the high generation number in the generation range of static view 118 of snapshot 115 that manages the address being read and then determines one of the key-value pairs 116 found in block 224 that has a key with the most recent generation number that is older than or equal to the high generation number, reads the corresponding value to determine a storage location in storage 112, and returns the data stored at that location. Block 426 may loop back to block 422 to handle another read to the same snapshot 115 or another snapshot.

FIG. 4-3 is a block diagram illustrating a method 430 for garbage collector 110 (FIG. 1-1) to periodically delete unneeded old data from array 112 (FIG. 1-1) in some examples of the present disclosure. Method 430 may begin in block 432.

In block 432, garbage collector 110 finds all the stored writes for a given address at a base volume 114. Specifically, garbage collector 110 queries all the key-value pairs 116 for those having keys that identify the view family of base volume 114 that manages the given address and also the address. Block 432 may be followed by block 434.

In block 434, for a (first) generation range between the creation generation number of base volume 114 and the creation generation number of a (first) static view 118b of snapshot 115, garbage collector 110 reclaims space in array 112 by deleting all but the stored write that is tagged with the most recent generation number in the (first) generation range. Specifically, for the (first) generation range between the creation generation number of base volume 114 (or the corresponding dynamic view 118a) and the creation generation number of (first) base volume 115 (or the corresponding static view 118b), garbage collector 110 reclaims space in array 112 by deleting all but the stored write that is tagged with the most recent generation number in the (first) generation range. More specifically, garbage collector 110 determines one of the key-value pairs 116 found in block 432 that has a key with the most recent generation number in the (first) generation range in the (first) static view 118b of the (first) snapshot 115 and deletes the remainder of the stored writes from the key-value pairs 116 found in block 432 that are in the (first) generation range. Block 434 may loop back to block 232 to process another address of the same base volume 114. Alternatively, if there is an additional snapshot 115 of base volume 114, block 434 may be followed by block 436.

In block 436, for a second generation range between the creation generation number of the first snapshot 115 (or the corresponding first static view 118b) and the creation generation number of a second snapshot 115 (or the corresponding static view 118b), garbage collector 110 reclaims space in array 112 by deleting all but the stored write that is tagged with the most recent generation number in the second generation range. Specifically, garbage collector 110 determines one of the key-value pairs 116 found in block 432 that has a key with the most recent generation number in the second generation range in the second static view 118b of second snapshot 115 and deletes the remainder of the stored writes from the key-value pairs 116 found in block 432 that are in the second range. Block 436 may loop back to block 432 to process another address of the same virtual volume 114. Alternatively block 436 may loop back to itself to process any additional snapshots 115 of base volume 114 as a base volume 114 may have many snapshots 115.

After looping through all the addresses of one virtual volume 114, garbage collector 110 may process another base volume 114. Alternatively, garbage collector 110 may also perform method 430 in parallel for multiple addresses or multiple base volumes 114.

Figure 5:
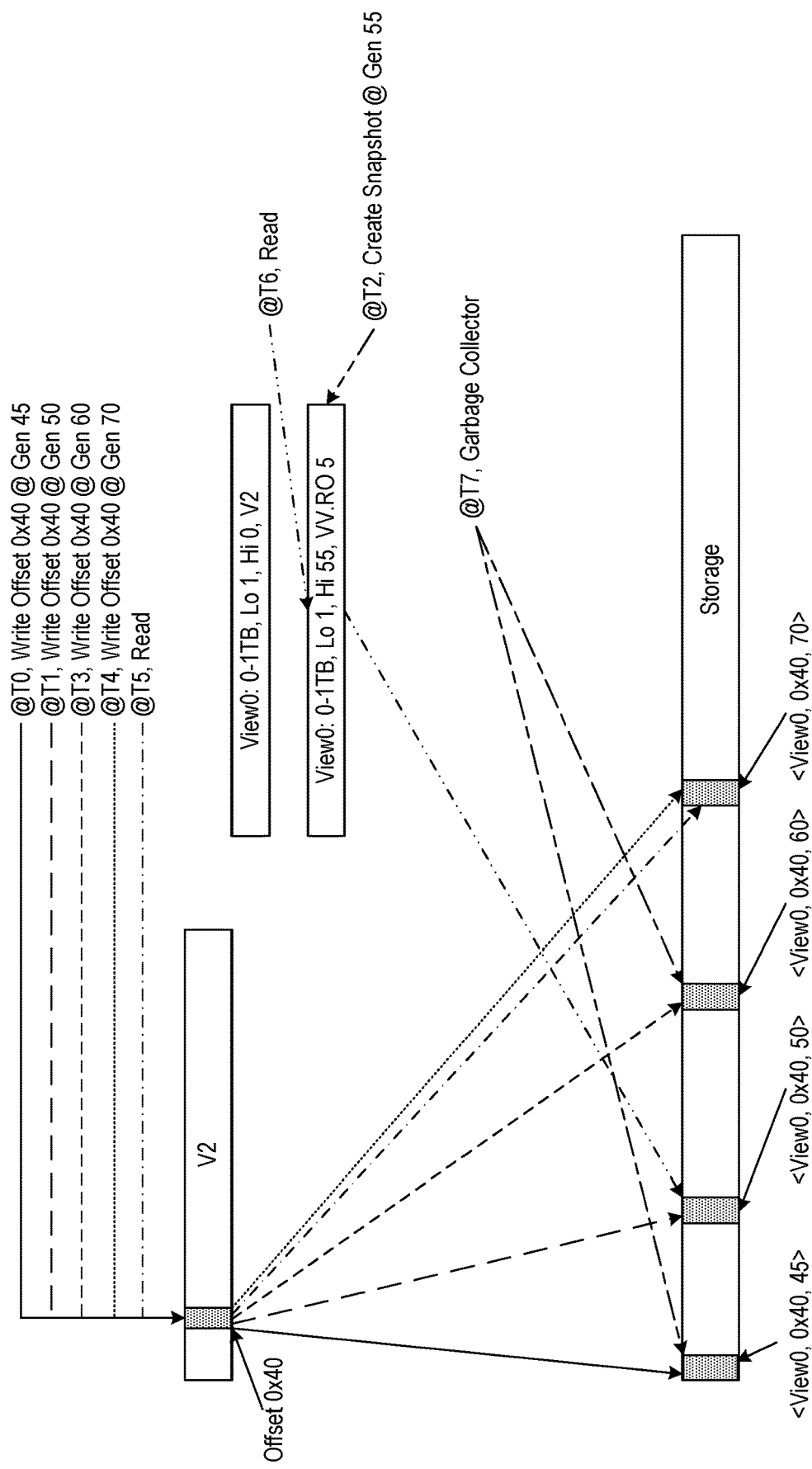
FIG. 5 is a block diagram illustrating the methods of FIGS. 4-1, 4-2, and 4-3 in some examples of the present disclosure.

FIG. 5 is a block diagram illustrating methods 410, 420, and 430 (FIGS. 4-1, 4-2, and 4-3) in some examples of the present disclosure.

At time T0, a storage client 102 (FIG. 1-1) issues a first write command to a base volume V2 at an offset 0x40. In response, IO processor 106 (FIG. 1-1) increments the generation number from a prior value to 45 and creates a first key-value pair 116 having a key of <View0, 0x40, 45> and a value of a first location in array 112 (FIG. 1-1). Note that base volume V2 has a creation generation number 1.

At time T1, storage client 102 issues a second write command to base volume V2 at the same offset 0x40. In response, IO processor 106 increments the generation number from a prior value to 50 and creates a second key-value pair 116 having a key of <View0, 0x40, 50> and a value of a second location in array 112.

At time T2, storage client 102 issues a request to create a snapshot VV.RO 5 of base volume V2. In response, IO processor 106 creates a static views 118b (only one is shown for simplicity). Each static view 118b identifies its view family, an address range, a generation range (a low generation number that is the creation generation number of base volume V2 and a high generation number of 55 that is the creation generation number of snapshot VV.RO 5 (or the static view itself), and optionally its snapshot name.

At time T3, storage client 102 issues a third write command to base volume V2 at the same offset 0x40. In response, IO processor 106 increments the generation number from a prior value to 60 and creates a third key-value pair 116 having a key of <View0, 0x40, 60> and a value of a third location in array 112.

At time T4, storage client 102 issues a fourth write command to base volume V2 at the same offset 0x40. In response, IO processor 106 increments the generation number from a prior value to 70 and creates a fourth key-value pair 116 having a key of <View0, 0x40, 70> and a value of a fourth location in array 112.

At time T5, storage client 102 issues a read command to base volume V2 at offset 0x40. In response, IO processor 106 finds the four key-value pairs 116 having keys that identify view family View0 of base volume V2 and offset 0x40 and returns the value from the fourth key-value pair 116 (having the key of <View0, 0x40, 70>) because it has the most recent generation number.

At time T6, storage client 102 issues a read command to snapshot VV.RO 5 at offset 0x40. In response, IO processor 106 finds the four key-value pairs 116 having keys that identify view family View0 of base volume V2 and offset 0x40 and returns the value from the second key-value pair 116, which has the key of <View0, 0x40, 50> because it has the most recent generation number that is older than or equal to the creation generation number 55 of the corresponding static view 118b of snapshot VV.RO 5 that manages the address being read.

At time T7, garbage collector 110 (FIG. 1-1) deletes all the stored writes but ones corresponding to the second and the fourth key-value pairs 116 because they correspond to stored writes needed for snapshot VV.RO 5 (the stored write that has the most recent generation number that is older than or equal to the creation generation number of static view 118b of the snapshot) and base volume V2 (the stored write that has the most recent generation number).

Figures 1, 6:
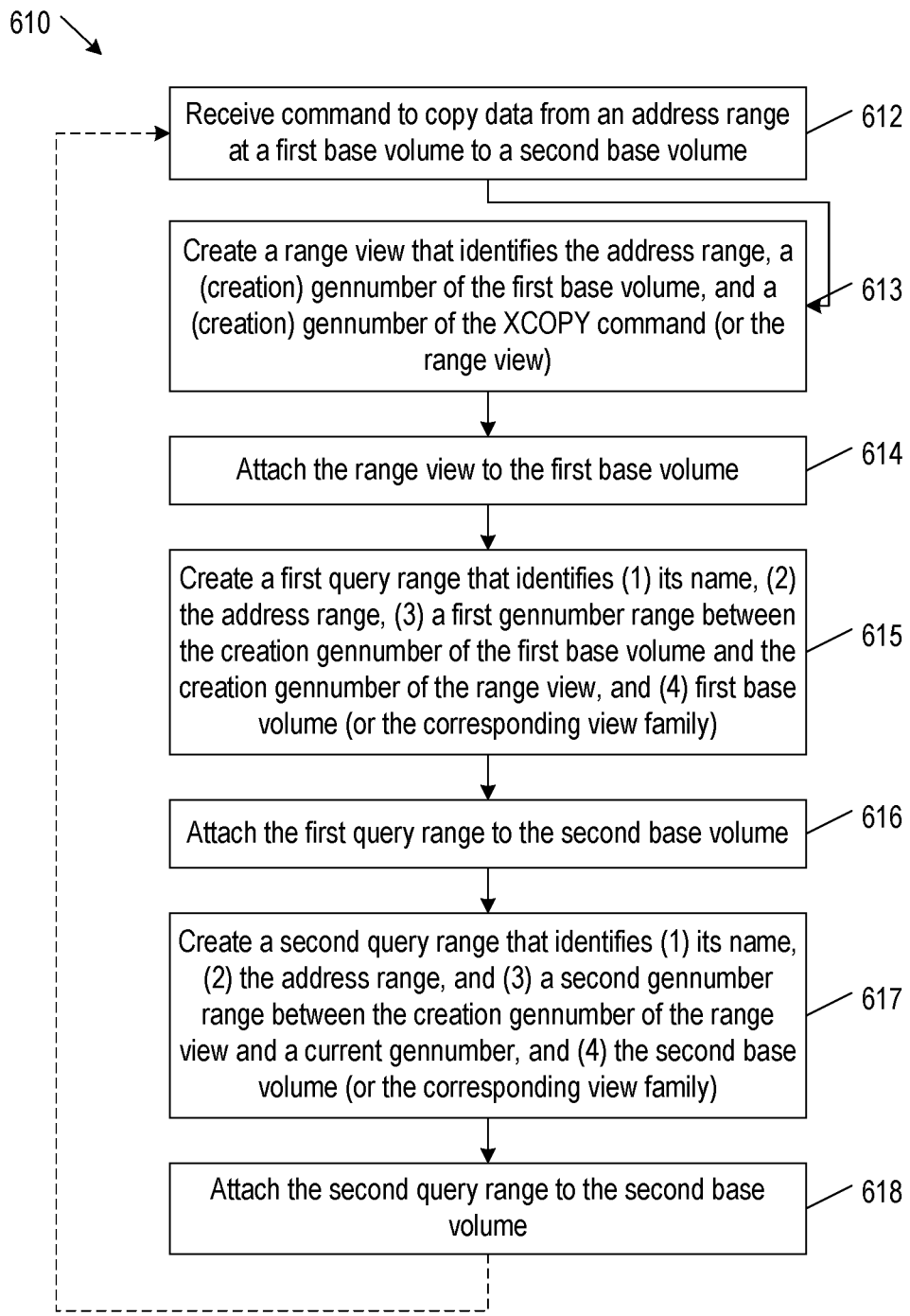
Figures 2, 6:
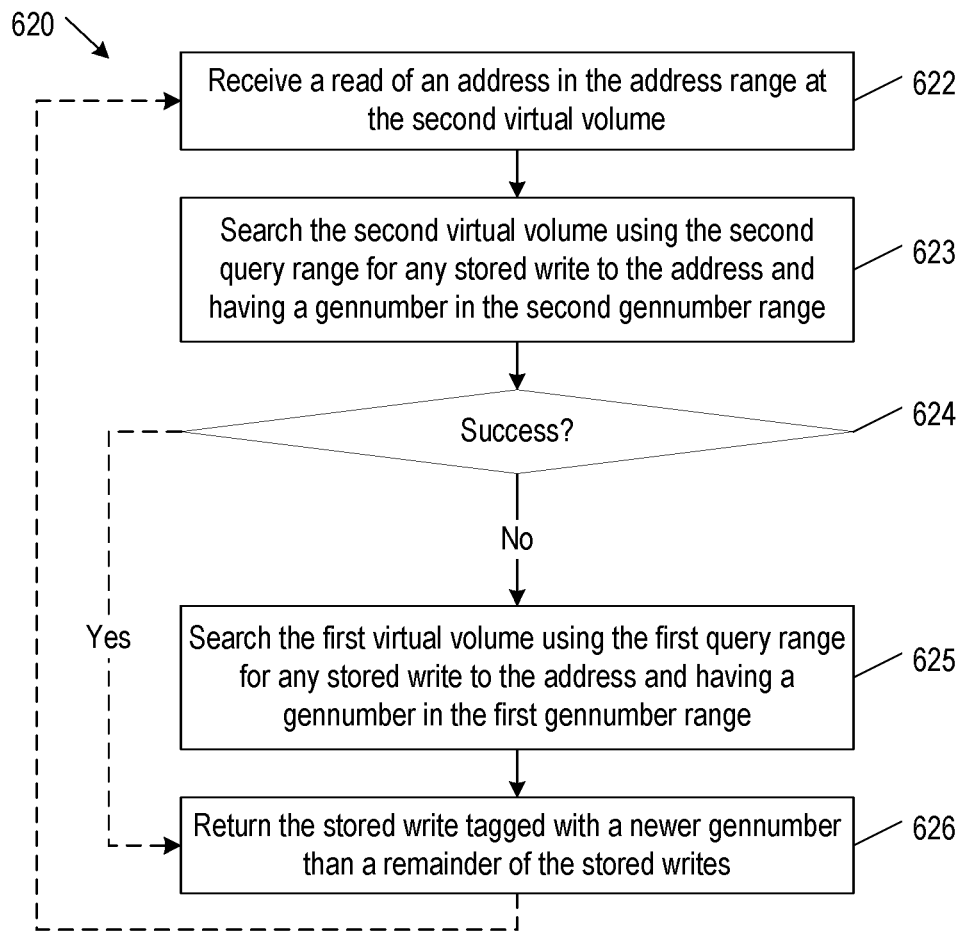
Figures 3, 6:
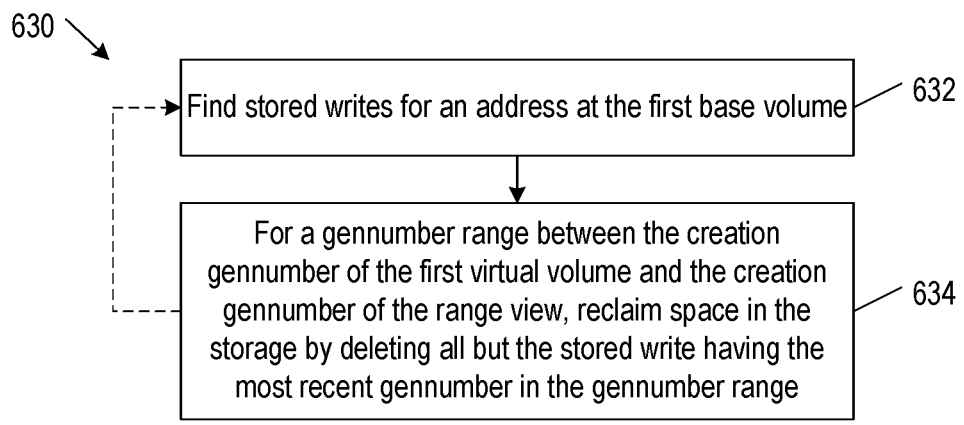

FIG. 6-1 is a block diagram illustrating a method 610 for IO processor 106 (FIG. 1-1) to perform an XCOPY command in some examples of the present disclosure. Method 610 may begin in block 612.

In block 612, IO processor 106 receives an XCOPY command to copy data from an address range at a first (source) base volume to a (destination) second base volume. Note that the first (source) and the second (destination) base volumes may be the same, i.e., data may be copied from one address range to another on the same base volume 114. Block 612 may be followed by block 613.

In block 613, IO processor 106 creates a range view 118e (FIG. 7) that identifies the (copied) address range, the creation generation number of the first (source) base volume, and the creation generation number of the XCOPY command (or the range view). Block 613 may be followed by block 614.

In block 614, IO processor 106 attaches range view 118e to the first (source) base volume 114. Specifically, attaching range view 118e to the first (source) base volume 114 means IO processor 106 adds the view to the corresponding view family of the first (source) base volume 114 so the copied data is protected from garbage collection. Block 614 may be followed by block 615.

In block 615, IO processor 106 creates a first query range 120a that identifies (1) its name QR1, (2) the (copied) address range, (3) a first range between the creation generation number of the first (source) base volume and the creation generation number of the XCOPY command (or the range view 118e), and (4) the first (source) base volume. A query range 120a specifies that within a specified address range (recorded in the query range), and for a specific generation range (between Lo and Hi), which base volume to retrieve the data from. Note that the first (source) base volume may be identified directly by its ID or by the ID of the corresponding view family of the first (source) base volume. Block 615 may be followed by block 616.

In block 616, IO processor 106 attaches the first query range 120 to the second (destination) virtual volume. Attaching a query range 120 to a base volume 114 means IO processor 106 adds the query range to a stack of query ranges to be processed (e.g., in the order of their sequential names) when the IO processor handles a read request for the base volume. Block 616 may be followed by block 617.

In block 617, IO processor 106 creates a second query range 120 that identifies (1) its name QR0, (2) the (copied) address range, (3) a second range between the creation generation number of the XCOPY command (or the range view 118e) and a current generation number (indicated as "0"), and (4) the second (destination) base volume. As previously described, query range 120a specifies that within a specified address range (recorded in the query range), and for a specific generation range (between Lo and Hi), which base volume to retrieve data from. Note the second (destination) base volume may be identified directly by its ID or by the ID of the corresponding view family of the second (destination) base volume. Block 617 may be followed by block 618.

In block 618, IO processor 106 attaches the second query range 120 to the second (destination) virtual volume. As previously explained, attaching a query range 120 to a base volume 114 means IO processor 106 adds the query range to a stack of query ranges to be processed (e.g., in the order of their sequential names) when the IO processor handles a read request for the base volume. Block 618 may loop back to block 612 to process another XCOPY command.

FIG. 6-2 is a block diagram illustrating a method 620 for IO processor 106 (FIG. 1-1) to handle a read request to the second (destination) base volume in some examples of the present disclosure. Method 620 may begin in block 622.

In block 622, IO processor 106 receives a read of an address (an offset) at the second (destination) base volume in the (copied) address range of the first and the second query ranges 120. Block 622 may be followed by block 623.

In block 623, in response to the read of the address at the second (destination) base volume, IO processor 106 goes through the stack of query ranges 120 (FIG. 1-1) attached to the second (destination) base volume (e.g., in the order of the sequential names of the query ranges) to see if the read address is in the address range of any of the query ranges. Assuming the read address is in the address range of the first and the second query ranges 120, IO processor 106 uses the second query range 120b to find all the stored writes for that address at the second (destination) base volume. Specifically, IO processor 106 queries all the key-value pairs 116 for those having keys that identify the address and the second (destination) base volume (or the corresponding view family of the destination base volume) that have generation numbers between the creation generation number of the XCOPY command (or range view 118e) and the current generation number (indicated as "0"). Block 623 may be followed by block 624.

In block 624, IO processor 106 determines if it has found such key-value pairs 116. If so, block 624 may be followed by block 626. Otherwise block 624 may be followed by block 625.

In block 625, IO processor 106 uses the first query range 120a to find all the stored writes for that address at the first (source) base volume. Specifically, IO processor 106 queries all the key-value pairs 116 for those having keys that identify the address and the first (source) base volume (or the corresponding view family of the source base volume) that have the generation numbers in the range between the creation generation number of the first (source) base volume and the creation generation number of the XCOPY command (or range view 118e). If no keys are found, which indicate that the offset was never written, IO processor 106 returns zero data. Block 625 may be followed by block 626.

In block 626, IO processor 106 returns one of the stored writes for that address that is tagged with a newer generation number than a remainder of the stored writes. Specifically, IO processor 106 determines one of the key-value pairs 116 found in block 623 or 625 that has a key with the most recent generation number, reads the corresponding value to determine a location in array 112, and returns the value stored at that location. Block 626 may loop back to block 622 to handle another read request to the second (destination) base volume.

FIG. 6-3 is a block diagram illustrating a method 430 for garbage collector 110 (FIG. 1-1) to periodically delete unneeded old data from array 112 (FIG. 1-1) in some examples of the present disclosure. Method 630 may begin in block 632.

In block 632, garbage collector 110 finds all the stored writes for an address at the first (source) base volume. Specifically, garbage collector 110 queries all the key-value pairs 116 for those having keys that identify the specific address and the first (source) base volume. Block 632 may be followed by block 634.

In block 634, for the range between the creation generation number of the first (source) base volume and the creation generation number of the XCOPY command (or range view 118c), garbage collector 110 reclaims space in array 112 by deleting all but the stored write that is tagged with the most recent generation number in the range. Specifically, garbage collector 110 determines one of the key-value pairs 116 found in block 632 that has a key with the most recent generation number in the range and deletes the remainder of the stored writes from the key-value pairs 116 found in block 632 that are in the range. Block 634 may loop back to block 232 to process another address of the first (source) base volume.

Garbage collector 110 may also determines if all the addresses in the address range of range view 118e have been written after receiving the XCOPY command, i.e., there is a stored write for each address in the address range with a generation number greater than the creation generation number of the range view. If so, garbage collector 110 may delete range view 118e and the associated query ranges 120 as the original data in the first (source) base volume are no longer needed.

Figure 7:
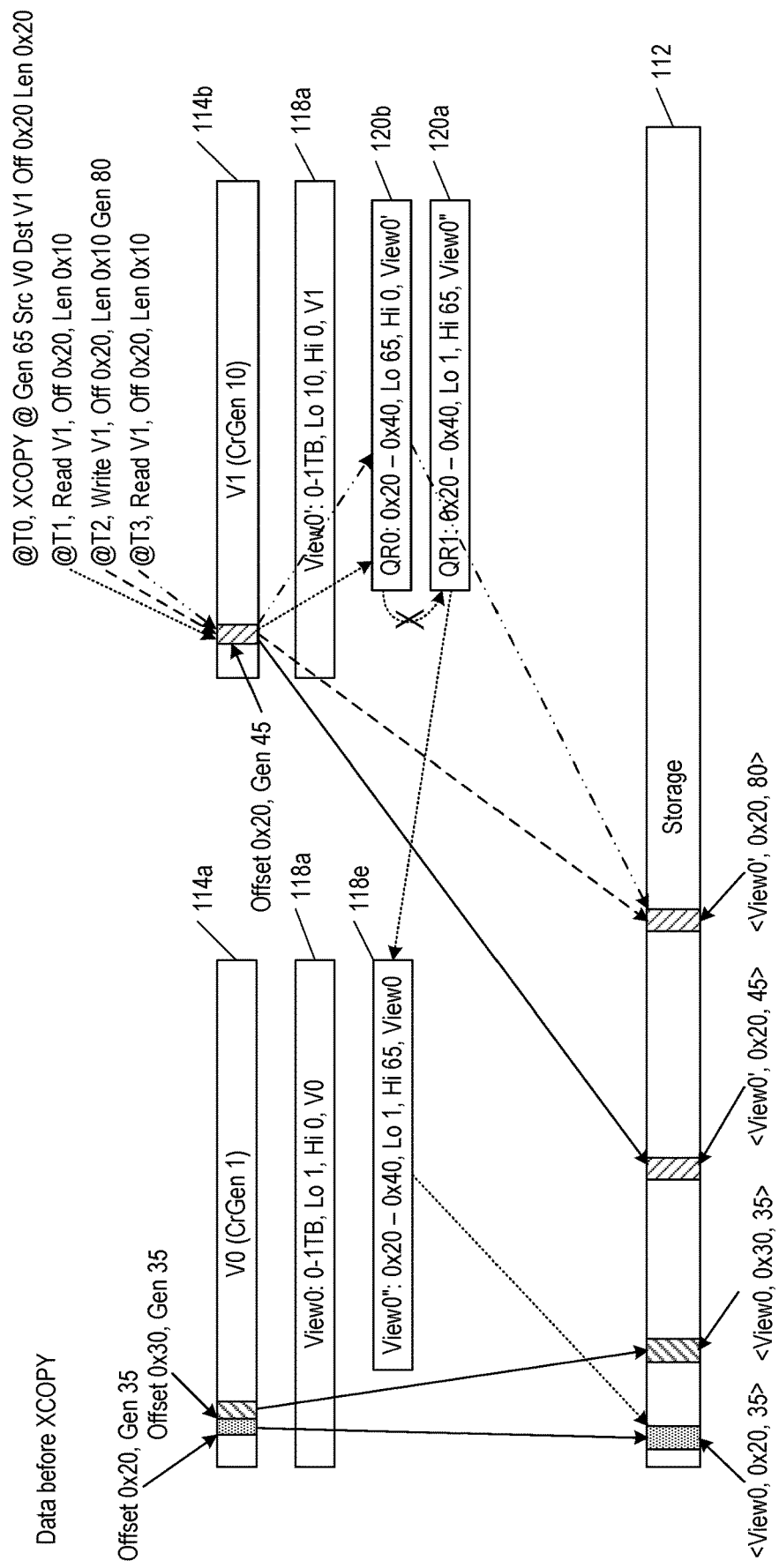
FIG. 7 is a block diagram illustrating the methods of FIGS. 6-1, 6-2, and 6-3 in some examples of the present disclosure.

FIG. 7 is a block diagram illustrating methods 610, 620, and 630 (FIGS. 6-1, 6-2, and 6-3) in some examples of the present disclosure. Prior to a storage client 102 (FIG. 1-1) issuing an XCOPY command, a first (source) base volume 114a (named V0) has key-value pairs 116 with keys <View0, 0x20, 35> and <View0, 0x30, 35> while a second (destination) virtual volume 114b (named V1) has a key-value pair 116 with a key <View0', 0x20, 45>.

At time T0, storage client 102 issues an XCOPY command to copy to an address range with a starting address (offset) of 0x20 and a length of 0x20 from virtual volume V0 to the second (destination) virtual volume V1. In response, IO processor 106 (FIG. 1-1) creates a range view 118e for the (copied) address range 0x20 to 0x40 and a generation range between the creation generation number 1 of the first (source) base volume V0 and the creation generation number 65 of the XCOPY command (or range view 118e). Range view 118e identifies the first (source) base volume V0 (or the corresponding view family, e.g., View0, of the source base volume). IO processor 106 attaches range view 118e to the first (source) base volume V0. IO processor 106 also creates a first query range 120a and a second query range 120b for the (copied) address range. The first query range 120a identifies the first (source) base volume V0 (or the corresponding range view, e.g., View0" of the source base volume) and a first range between the creation generation number 1 of the first (source) base volume V0 and the creation generation number 65 of the XCOPY command (or range view 118c). The second query range 120b identifies the second destination virtual volume V1 (or the corresponding view family, e.g., View0', of the source base volume), the (copied) address range, and a second range between the creation generation number 65 of range view 118e and the current generation number (indicated by 0). IO processor 106 attaches query ranges 120a and 120b to the second (destination) base volume V1.

At time T1, storage client 102 issues a first read of an address (offset) 0x20 with a length 0x10 at the second (destination) base volume V1, which is in the address range of the first query range 120a and the second query range 120b. In response, IO processor 106 uses the second query range 120b to search the second (destination) base volume VI for any stored write having a generation number in the second range. Since the stored write with key <V1, 0x20, . . . > is older and outside the second range (indicated by the crossed out lead line), IO processor 106 proceeds to use the first query range 120a to search the first (source) base volume V1, via range view 118e, for any stored write having a generation number in the first range. IO processor 106 finds the stored write with keys <v0, 0x20, 35> and returns the value at the corresponding location in storage 112. Thus, the data stored at offset 0x20 in V1 with Gen number 0x45 was obfuscated by the copy command, and the imposition of the query range filters in the read path.

At time T2, storage client 102 issues a write command to the second (destination) base volume V1 at offset 0x20 with a length 0x10. In response, IO processor 106 increments the generation number from a prior value to 80 and creates a key-value pair 116 having a key of <View0', 0x20, 80> and a value of a location in storage 112.

At time T3, storage client 102 issues a second read of an address (offset) 0x20 with a length 0x10 at the second (destination) base volume V1, which is in the address range of query ranges 120a and b. In response, IO processor 106 uses the second query range 120b to search the second (destination) base volume V1 for any stored write having a generation number in the second range. IO processor 106 finds the stored write with keys <View0', 0x20, 80> and returns the value at the corresponding location in storage 112.

Figures 1, 8:
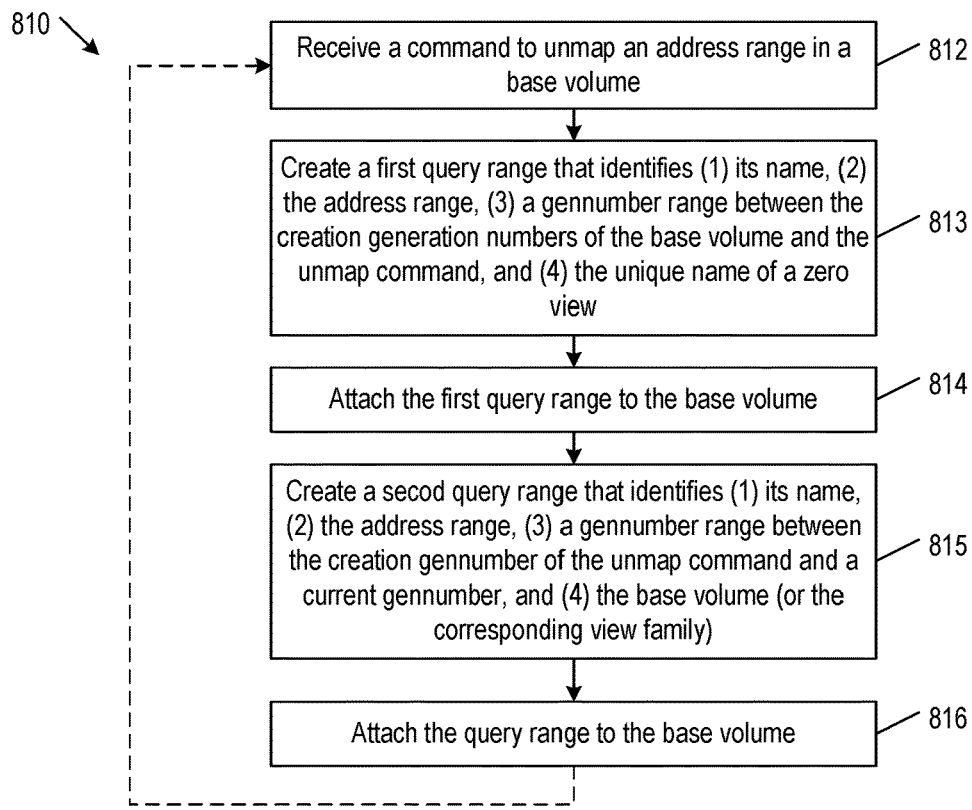
Figures 2, 8:
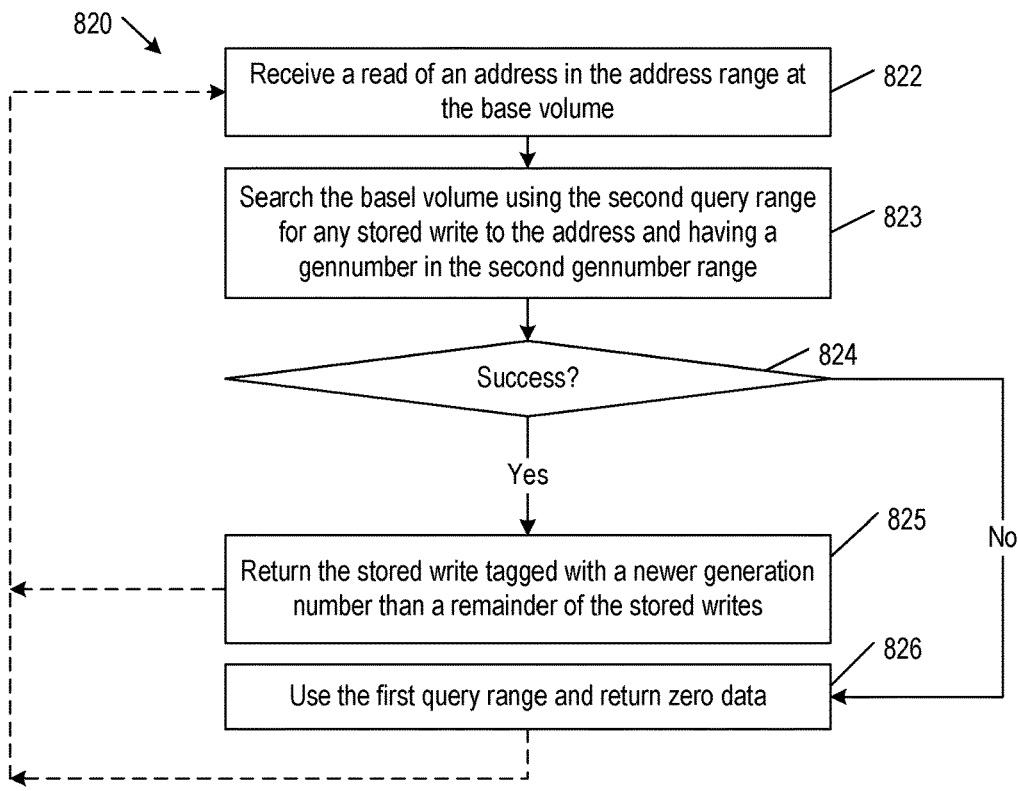
Figures 3, 8:
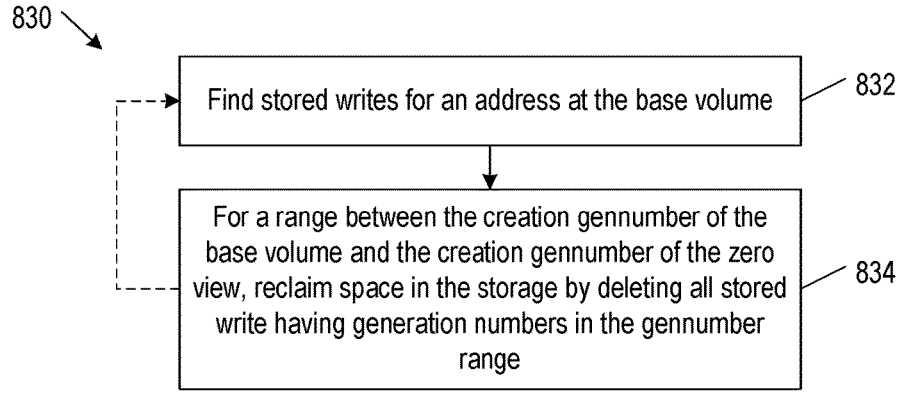

FIG. 8-1 is a block diagram illustrating a method 810 for IO processor 106 (FIG. 1-1) to perform an UNMAP command in some examples of the present disclosure. Method 810 may begin in block 812.

In block 812, IO processor 106 receives an UNMAP command to unmap an address range at a base volume 114 (FIG. 1-1). Block 812 may be followed by block 813.

In block 813, IO processor 106 creates a first query range 120-1 that identifies (1) its name QR1, (2) the (unmapped) address range, (3) a first range between the creation base volume 114 (or the corresponding dynamic view) and the creation generation number of the UNMAP command, and (4) the unique name of the zero view. Block 813 may be followed by block 814.

In block 814, IO processor 106 attaches the first query range 120-1 to base volume 114. Attaching query range 120-1 to base volume 114 means IO processor 106 adds the query range to a stack of query ranges to be processed (e.g., in the order of their sequential names) when the IO processor handles a read request for the base volume. Block 814 may be followed by block 815.

In block 815, IO processor 106 creates a second query range 120-2 that identifies (1) its name QR0, (2) the (unmapped) address range, (3) a range between the creation generation number of the UNMAP command and a current generation number (indicated as "0"), and (4) base volume 114. Note base volume 114 may be identified directly by its ID or the ID of the corresponding view family of the base volume. Block 815 may be followed by block 816.

In block 816, IO processor 106 attaches query range 120-2 to the virtual volume 114. As previously explained, attaching query range 120-2 to base volume 114 means IO processor 106 adds the query range to a stack of query ranges to be processed (e.g., in the order of their sequential names) when the IO processor handles a read request for the base volume. Block 816 may loop back to block 812 to process another UNMAP command.

FIG. 8-2 is a block diagram illustrating a method 820 for IO processor 106 (FIG. 1-1) to handle a read request to a base volume 114 (FIG. 1-1), such as the one described in method 810, in some examples of the present disclosure. Method 820 may begin in block 822.

In block 822, IO processor 106 receives a read of an address (an offset) at the base
volume 114 in the (unmapped) address range of the zero view 118 (FIG. 1-1). Block 822 may be followed by block 823.

In block 823, in response to the read of the address at base volume 114, IO processor 106 goes through the stack of query ranges 120 (FIG. 1-1) attached to the base volume (e.g., in the order of the sequential names of the query ranges) to see if the read address is in the address range of any of the query ranges. Assuming the read address is in the address range of the first and the second query ranges 120, IO processor 106 uses the second query range 120-2 to find all the stored writes for that address at the second (destination) base volume. Specifically, IO processor 106 queries all the key-value pairs 116 for those having keys that identify the address and base volume 114 (or the corresponding view family of the destination base volume) that have generation numbers between the creation generation number of the UNMAP command and the current generation number (indicated as "0"). Block 823 may be followed by block 824.

In block 824, IO processor 106 determines if it has found such key-value pairs 116. If so, block 824 may be followed by block 825. Otherwise block 824 may be followed by block 826.

In block 825, IO processor 106 returns one of the stored writes for that address that is tagged with a newer generation number than a remainder of the stored writes. Specifically, IO processor 106 determines one of the key-value pairs 116 found in block 823 that has a key with the most recent generation number, reads the corresponding value to determine a location in storage 112 (FIG. 1-1), and returns the value stored at that location. Block 825 may loop back to block 822 to handle another read request to the virtual volume 114.

In block 826, IO processor 106 uses the first query range 120-1 and returns "zero" data. Block 826 may loop back to block 822 to handle another read request to the virtual volume 114.

FIG. 8-3 is a block diagram illustrating a method 830 for garbage collector 110 (FIG. 1-1) to periodically delete unneeded old data from storage 112 (FIG. 1-1) in some examples of the present disclosure. Method 830 may begin in block 832.

In block 832, garbage collector 110 finds all the stored writes for an address at a base volume 114. Specifically, garbage collector 110 queries all the key-value pairs 116 (FIG. 1-1) for those having keys that identify the specific address and base volume 114. Block 832 may be followed by block 834.

In block 834, for the range between the creation generation number of base volume 114 and the creation generation number of the UNMAP command, garbage collector 110 reclaims space in storage 112 by deleting all the stored writes in the range. Specifically, garbage collector 110 deletes the stored writes from the key-value pairs 116 found in block 823 that are in the range. Block 834 may loop back to block 832 to process another address of the base volume 114.

Garbage collector 110 may also determines if all the addresses in the address range of the first query range 120-1 have been written after receiving the UNMAP command, i.e., there is a stored write for each address in the address range with a generation number greater than the creation generation number of the UNMAP command. If so, garbage collector 110 may delete query ranges 120-1 and 120-2 as the newest data should be read from base volume 114.

Figure 9:
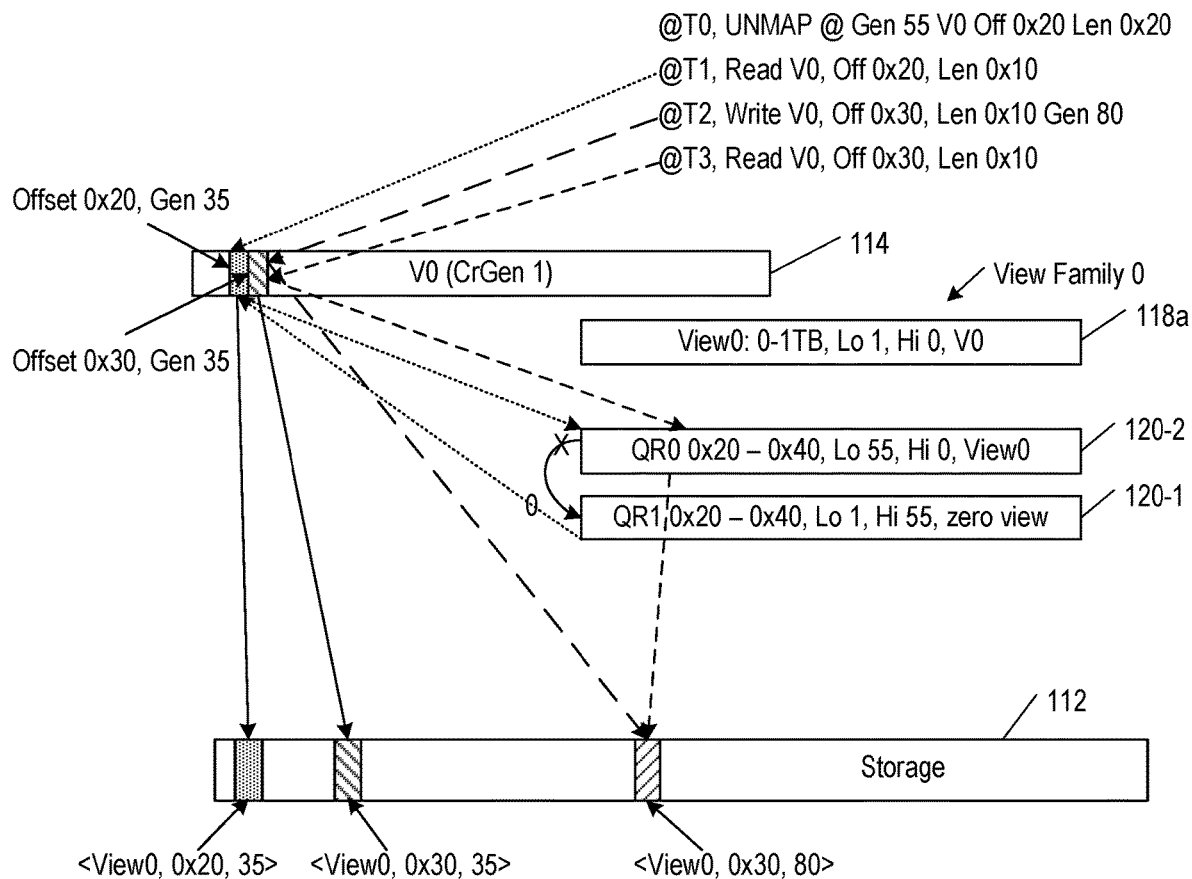
FIG. 9 is a block diagram illustrating the methods of FIGS. 8-1, 8-2, and 8-3 in some examples of the present disclosure.

FIG. 9 is a block diagram illustrating methods 810, 820, and 830 (FIGS. 8-1, 8-2, and 8-3) in some examples of the present disclosure. Prior to a storage client 102 (FIG. 1-1) issuing an UNMAP command, a base volume 114 (named V0) has key-value pairs 116 with keys <View0, 0x20, 35> and <View0, 0x30, 35>. At time T0, a storage client 102 (FIG. 1-1) sends an UNMAP command to unmap the address range with a starting address (offset) of 0x20 and a length of 0x20 from base volume V0, which is received by IO processor 106 (FIG. 1-1) at generation number 55. In response, IO processor 106 creates first query range 120-1 that identifies (1) its name QR1, (2) the (unmapped) address range 0x20 to 0x40, (3) a generation range between the creation generation number 1 of base volume V0 and the creation generation number 55 of the UNMAP command (or the zero view), and (4) the unique name of the zero view. IO processor 106 attaches first query range 120-1 to base volume V0. IO processor 106 also creates a second query range 120-2 that identifies (1) its name, (2) the (unmapped) address range, (3) a range between the creation generation number 55 of the UNMAP command (or zero view) and the current generation number (indicated by 0), and (4) base volume 114 (or the corresponding view family). IO processor 106 attaches the query range 120-2 to base volume V0.

At time T1, storage client 102 issues a first read of an address (offset) 0x20 with a length 0x10 at base volume V0, which is in the (unmapped) address range of query range 120-1. In response, IO processor 106 uses query range 120-2 to search base volume V0 for any stored write having a generation number in the range between the creation generation number 55 of the UNMAP command and the current generation number. IO processor 106 is unable to find such a stored write since the stored write with key <View0, 0x20, . . . > is older and outside the range (indicated by the crossed out lead line). IO processor 106 then uses the query range 120-1 and returns 0 data.

At time T2, storage client 102 issues a write command to base volume V0 at offset 0x30 with a length 0x10. In response, IO processor 106 increments the generation number from a prior value to 80 and creates a key-value pair 116 having a key of <View0, 0x20, 80> and a value of a location in storage 112.

At time T3, storage client 102 issues a second read of an address (offset) 0x30 with a length 0x10 at base volume V0, which is in the (unmapped) address range of query ranges 120-2. In response, IO processor 106 uses query range 120-2 to search base volume V0 for any stored write having a generation number in the range between the (creation) generation number 55 of the UNMAP command and the current generation number. IO processor 106 finds the stored write with keys <View0, 0x30, 80> and returns the value at the corresponding location in storage 112.

As described above, for the address range greater than 0x40, regardless of generation number, IO processor 106 will perform reads from base volume V0. For the range 0x20 to 0x40, from the (creation) generation number 55 of the UNMAP command to the current generation number (indicated by "0"), IO processor 106 will perform reads from base volume 114. Thus, by simply attaching query range 120-2 with the zero view to base volume 114 for the specified address (e.g., LBA) range and generation number range, storage system 104 is able to affect an UNMAP operation without having to modify any virtual to physical mappings or having to write any data.

Various other adaptations and combinations of features of the examples disclosed are within the scope of the invention. Numerous examples are encompassed by the following claims.

What is claimed is:

1. A method for operating a storage system, the method comprising:
    receiving a series of write requests from one or more storage clients to a base virtual volume, the write requests specifying respective data to be written to respective offsets in the base virtual volume, at least two of the write requests requesting writing to a same first offset in the base virtual volume, the two write requests corresponding to two versions of a same respective data;
    for individual write requests of the series of write requests, performing a write process comprising:
        assigning to the write request a generation number from a series of generation numbers, the generation number uniquely identifying the write request;
        storing the data from the write request in a physical storage; and
        adding an entry to a database, the entry identifying the offset in the base virtual volume, the generation number of the write request, and a location in which the data from the write request is stored.

2. The method of claim 1, further comprising:
    receiving a first read request requesting the data at the first offset in the base virtual volume; and
    in response to the first read request, performing a read process comprising:
        identifying a set of entries in the database including the entries that identify the first offset in the base virtual volume; and
        returning the data stored at the location identified by a newest entry of the set of entries, the newest entry determined by having a generation number that is newer than the generation numbers of a remainder of the set of entries.

3. The method of claim 2, further comprising performing a garbage collection process that reclaims space in the physical storage, the garbage collection process comprising:
    invalidating the data at the locations identified by the remainder of the entries in the set, thereby reclaiming space in the physical storage; and
    deleting from the database the remainder of the entries in the set.

4. The method of claim 1, further comprising:
capturing a snapshot virtual volume of the base virtual volume by creating a first metadata structure that identifies a creation generation number of the snapshot virtual volume without copying data in the physical storage.

5. The method of claim 4, further comprising:
receiving a second read request requesting data from the first offset in the snapshot virtual volume; and
in response to the second read request, performing a second read process comprising identifying a second set of entries in the database including entries that identify the first offset in the base virtual volume, and returning the data stored in the location identified by the entry that is in the second set that, based on the creation generation number of the snapshot and the generation numbers of the entries in the second set, is the newest of the entries in the set that are older than of the snapshot virtual volume.

6. The method of claim 1, further comprising performing a garbage collection process that reclaims space in the physical storage, the garbage collection process comprising, for a range between a creation generation number of the base virtual volume and the creation generation number of a static view, deleting all but a stored write having the most recent generation number in the range.

7. The method of claim 1, further comprising:
capturing a first snapshot virtual volume of the base virtual volume by creating a first metadata structure that identifies a first creation generation number of a first static view;
capturing a second snapshot virtual volume of the base virtual volume by creating a second metadata structure that identifies a second creation generation number of a second static view; and
reclaiming space in the physical storage by:
identifying a first set of entries including all entries in the database that identify offsets in the base virtual volume and generation numbers between a creation generation number of the base virtual volume and the first creation generation number; and
for individual offsets of the offsets identified by entries in the first set, identifying which of the entries in the first set and identifying the offset has a most recent generation number and invalidating the data at the locations identified by a remainder of the entries that are in the first set and identify the offset, thereby reclaiming space in the physical storage; and
identifying a second set of entries including all entries in the database that identify offsets in the base virtual volume and generation numbers between the first creation generation number and the second creation generation number; and
for individual offsets of the offsets identified by entries in the second set, identifying which of the entries in the second set and identifying the offset has a most recent generation number and invalidating the data at the locations identified by a remainder of the entries that are in the second set and identify the offset, thereby reclaiming space in the physical storage.

8. The method of claim 1, further comprising:
receiving a command to copy data from a source offset range at the base virtual volume to a target offset range at a second virtual volume;
creating a metadata structure that identifies the source offset range, the target offset range, a creation generation number of the base virtual volume, and a creation generation number of the metadata structure;
receiving a second read request requesting the data at a second offset that is within the target offset range at the second virtual volume; and
in response to the second read request, performing a read process comprising identifying a second set of entries in the database that includes the entries that identify the second offset in the second virtual volume and that includes entries that identify an offset in the source offset range, and returning the data stored in the location identified by a newest one of the entries in the second set.

9. The method of claim 8, further comprising reclaiming space in the storage by:
identifying a third set of entries that identify generation numbers in range between the creation generation number of the base virtual volume the creation generation number of the command; and
for each of the offsets identified by entries in the third set, identifying which of the entries in the third set and identifying the offset has a most recent generation number and invalidating the data at the locations identified by a remainder of the entries that are in the third set and identify the offset, thereby reclaiming space in the physical storage.

10. The method of claim 1, further comprising performing an unmap command by:
receiving a command to unmap data from an offset range at the base virtual volume;
creating a first query range that identifies the offset range, a creation generation number of the base virtual volume, and a creation generation number of the first query range;
attaching the first query range to the base virtual volume;
creating a second query range that identifies (1) the base virtual volume, (2) a range between the creation generation number of the first query range and a current generation number, and (3) a zero view for returning zero data; and
attaching the second query range to the virtual volume.

11. The method of claim 10, further comprising:
receiving a read of an offset in the offset range at the base virtual volume;
in response to receiving the read, using the first query range to search the base virtual volume for a stored write to the offset and having a generation number in the range;
when using the first query range to search the base virtual volume succeeds, returning the corresponding stored write; and
when using the first query range to search the base virtual volume fails, using the second query range to return the zero data.

12. The method of claim 11, further comprising reclaiming space in the storage by, for a range between the creation generation number of the base virtual volume and the creation generation number of first query range, deleting all the stored writes in the range.

13. The method of claim 2, wherein adding each of the entries to the database comprises creating in the database a key-value pair comprising a key and a value, the key identifying the base virtual volume, the offset in the base virtual volume, and a generation number when corresponding write request was received, the value identifying the location in which the data of the write request is stored.

14. The method of claim 13, wherein the read process comprises:
determining key-value pairs having keys identifying the base virtual volume and the offset;
from the key-value pairs, determining a key-value pair having a key identifying the newer generation number; and
reading and returning data from the location in the storage that the value of the key-value pair identifies.

15. The method of claim 1, wherein the physical storage comprises a logic unit number having a RAID 5 or 6 configuration.

16. A processor comprising one or more circuits to:
receive a series of write requests from a storage client to a base virtual volume, the write requests specifying respective data be written to respective offsets in the base virtual volume, at least two of write requests requesting writing to a same first offset in the base virtual volume, the two write requests corresponding to two versions of a same respective data;
for individual write requests of the write requests, perform a write process comprising:
assign to the write request a generation number from a series of generation numbers, the generation number uniquely identifying the write request;
store the data from the write request in a physical storage; and
add an entry to a database, the entry identifying the offset in the base virtual volume, the generation number of the write request, and a location in which the data from the write request is stored;
receive a first read request requesting the data at the first offset in the base virtual volume; and
in response to the first read request, perform a read process comprising:
identify a set of entries in the database including the entries that identify the first offset in the base virtual volume; and
return the data stored at a location identified by a newest entry of the set of entries, the newest entry determined by having a generation number that is newer than the generation numbers of a remainder of the set of entries.

17. The processor of claim 16, wherein the one or more circuits are further to:
receive a command to copy data from a source offset range at the base virtual volume to a target offset range at a second virtual volume;
create a metadata structure that identifies the source offset range, the target offset range, a creation generation number of the base virtual volume, and a creation generation number of the metadata structure;
receive a second read request requesting the data at a second offset that is within the target offset range at the second virtual volume; and
in response to the second read request, perform a read process comprising identifying a second set of entries in the database that includes the entries that identify the second offset in the second virtual volume and that includes entries that identify an offset in the source offset range, and returning the data stored in the location identified by a newest one of the entries in the second set.

18. The processor of claim 16, wherein the one or more circuits are further to:
perform an unmap command that comprises:
receive a command to unmap data from an offset range at the base virtual volume;
create a first query range that identifies the offset range, a creation generation number of the base virtual volume, and a creation generation number of the first query range;
attach the first query range to the base virtual volume;
create a second query range that identifies (1) the base virtual volume, (2) a range between the creation generation number of the first query range and a current generation number, and (3) a zero view for returning zero data; and
attach the second query range to the virtual volume.

19. The processor of claim 18, wherein the one or more circuits are further to reclaim space in the storage by, for a range between the creation generation number of the base virtual volume and the creation generation number of first query range, deleting all the stored writes in the range.

20. A system comprising:
one or more processors to:
perform a write process that assigns to a write request, received from one or more storage clients, a generation number from a series of generation numbers, the generation number uniquely identifying the write request, wherein the write process stores data from the write request in a physical storage, wherein the write process further adds an entry to a database, the entry identifying the generation number of the write request, and a location in which the data from the write request is stored; and
perform a read process in response to a first read request received from the one or more storage clients, the read process identifying a set of entries in the database, wherein the read process returns the data stored at a location identified by a newest entry of the set of entries, the newest entry determined by having a generation number that is newer than the generation numbers of a remainder of the set of entries.

* * * * *